(12) United States Patent
Fischer et al.

(10) Patent No.: US 6,353,728 B1
(45) Date of Patent: *Mar. 5, 2002

(54) SYSTEM AND METHOD FOR TRANSMITTING DATA

(75) Inventors: Larry G. Fischer, Waseca; William C. Hamer, Edina; Sheryl H. Phillips, Minneapolis, all of MN (US)

(73) Assignee: ADC Telecommunications, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/692,117

(22) Filed: Oct. 19, 2000

Related U.S. Application Data

(62) Division of application No. 09/409,753, filed on Oct. 1, 1999, which is a continuation of application No. 08/786,549, filed on Jan. 21, 1997, now Pat. No. 5,978,650.

(51) Int. Cl.⁷ .............................................. H04N 7/173

(52) U.S. Cl. ..................... 455/3.01; 455/3.05; 455/16; 455/20; 455/25

(58) Field of Search .............................. 455/3.01, 3.05, 455/7, 15, 16, 17, 20, 22, 23, 93, 102, 11.1, 426, 446, 447, 25; 375/211, 219, 220, 214, 216, 261, 281; 370/203, 206–207; 725/62, 73

(56) References Cited

U.S. PATENT DOCUMENTS

| | | | |
|---|---|---|---|
| 4,367,485 A | 1/1983 | Hemmie | ...................... 358/86 |
| 4,727,590 A | 2/1988 | Kawano et al. | ............. 455/422 |
| 4,747,160 A | 5/1988 | Bossard | |
| 4,987,486 A | 1/1991 | Johnson et al. | ............... 358/86 |

(List continued on next page.)

FOREIGN PATENT DOCUMENTS

| | | | |
|---|---|---|---|
| EP | 0 302 455 A2 | 2/1989 | ........... H04B/7/155 |
| EP | 0 637 145 A1 | 2/1995 | ............ H04B/7/26 |
| EP | 0809403 A2 | 11/1997 | .......... H04N/7/173 |
| EP | 809403 | 11/1997 | .......... H04N/7/173 |
| EP | 0282347 | 9/1998 | |
| JP | 407273730 A | * 10/1995 | ............ H04B/1/00 |
| WO | 96/11554 | 4/1996 | ............ H04Q/7/28 |

OTHER PUBLICATIONS

"Anonymous: "Extended Range Frequency Synthesis. Mar. 1979." ", *IBM Technical Disclosure Bulletin*, vol. 21, No. 10., XP002074599, 4129–4130, (Mar. 1979).

"IBM Technical Disclosure Bulletin", vol. 21, No. 10, pp. 4129–4130, (Mar. 1979).

*Primary Examiner*—Lee Nguyen
(74) *Attorney, Agent, or Firm*—Fogg Slifer & Polglaze, P.A.

(57) ABSTRACT

A transmission system (10). The transmission system communicates data to a number of subscribers (14a, 14b). The transmission system includes a transceiver (12) that has a number of highly directional antennas (28). A number of digital repeaters (16a, 16b, 16c) are disposed in a geographic region serviced by the transceiver. The repeaters include a sectorized antenna that communicates with subscribers in a number of sectors of the geographic region of the repeater. The repeater also includes an upstream demodulator/modulator circuit (19). The upstream demodulator/modulator circuit demodulates data from signals from subscribers that were modulated with a first modulation technique, and generates a re-modulated signal with the data using a second modulation technique. The second modulation technique is different from the first modulation technique such that the signals from the subscribers from the number of sectors are combined in the re-modulated signal so as to increase the capacity of the transmission system. The digital repeaters also include a highly directional antenna, that is coupled to the demodulator/modulator circuit and that communicates the remodulated signal to the transceiver.

9 Claims, 10 Drawing Sheets

U.S. PATENT DOCUMENTS

| | | | |
|---|---|---|---|
| 5,079,628 A | 1/1992 | Tomikawa | 358/86 |
| 5,218,714 A | 6/1993 | Ishibashi et al. | 455/5.1 |
| 5,223,923 A | 6/1993 | Morales-Garza | 358/84 |
| 5,235,619 A | 8/1993 | Beyers et al. | 375/38 |
| 5,257,099 A | 10/1993 | Morales-Garza | 358/84 |
| 5,317,392 A | 5/1994 | Ishibashi et al. | 348/6 |
| 5,351,270 A | 9/1994 | Graham et al. | 455/422 |
| 5,367,571 A | 11/1994 | Bowen et al. | 380/20 |
| 5,369,779 A | 11/1994 | Moreland | 455/5.1 |
| 5,394,559 A | 2/1995 | Hemmie et al. | 455/5.1 |
| 5,437,052 A | 7/1995 | Hemmie et al. | 455/5 |
| 5,440,632 A | 8/1995 | Bacon et al. | 380/20 |
| 5,481,073 A | 1/1996 | Singer et al. | 200/1 |
| 5,485,221 A | 1/1996 | Banker et al. | 348/563 |
| 5,499,047 A | 3/1996 | Terry et al. | 348/6 |
| 5,508,733 A | 4/1996 | Kassatly | 348/13 |
| 5,528,582 A | 6/1996 | Bodeep et al. | 370/24 |
| 5,530,469 A | 6/1996 | Garfinkle | 348/1 |
| 5,584,046 A | 12/1996 | Martinez et al. | 455/13.1 |
| 5,706,048 A | 1/1998 | Davis | 455/5.1 |
| 5,809,431 A | 9/1998 | Bustamante et al. | 455/562 |
| 5,890,055 A * | 3/1999 | Chu et al. | 455/16 |
| 5,978,650 A | 11/1999 | Fischer et al. | 455/3.1 |

\* cited by examiner

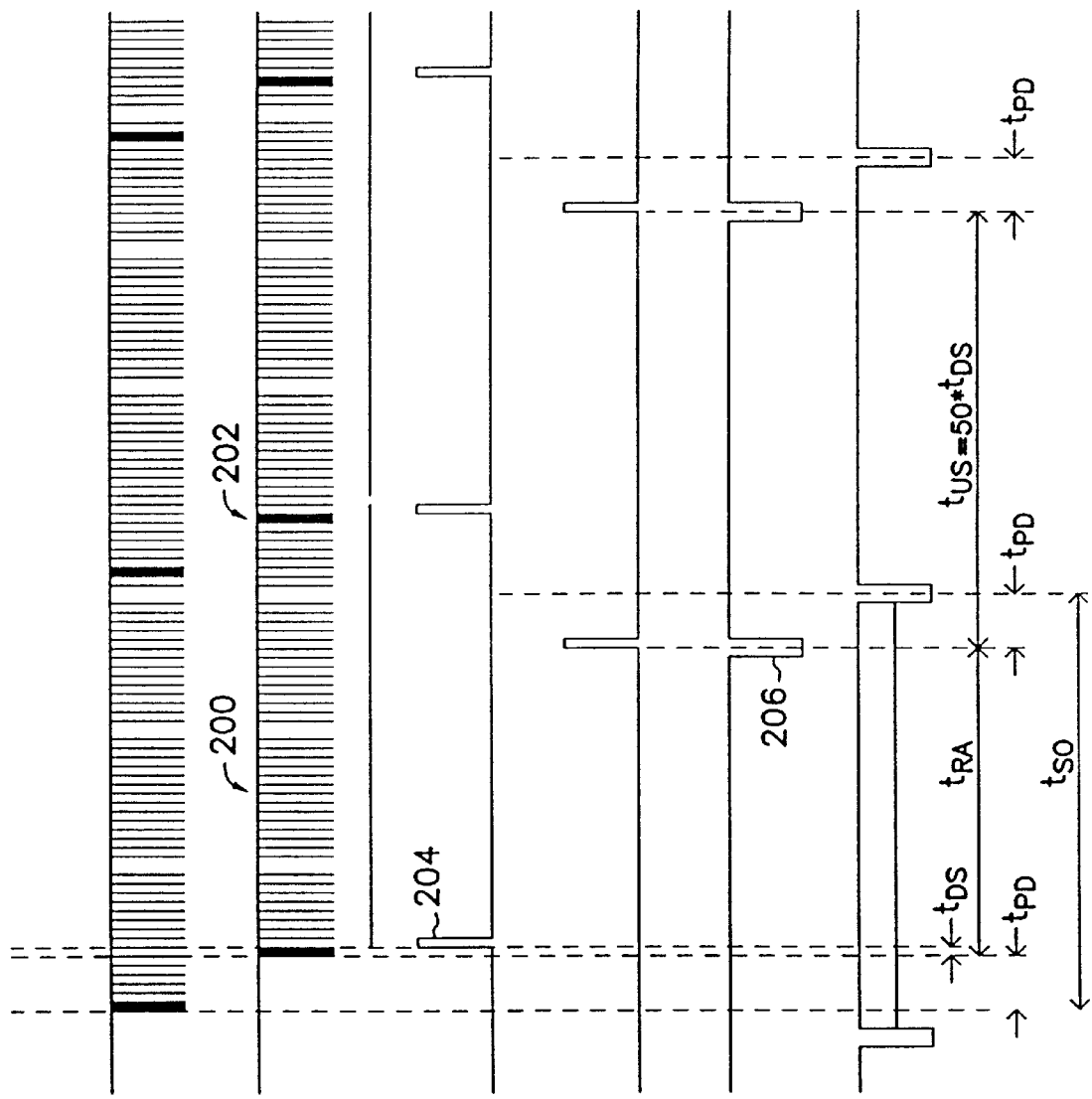

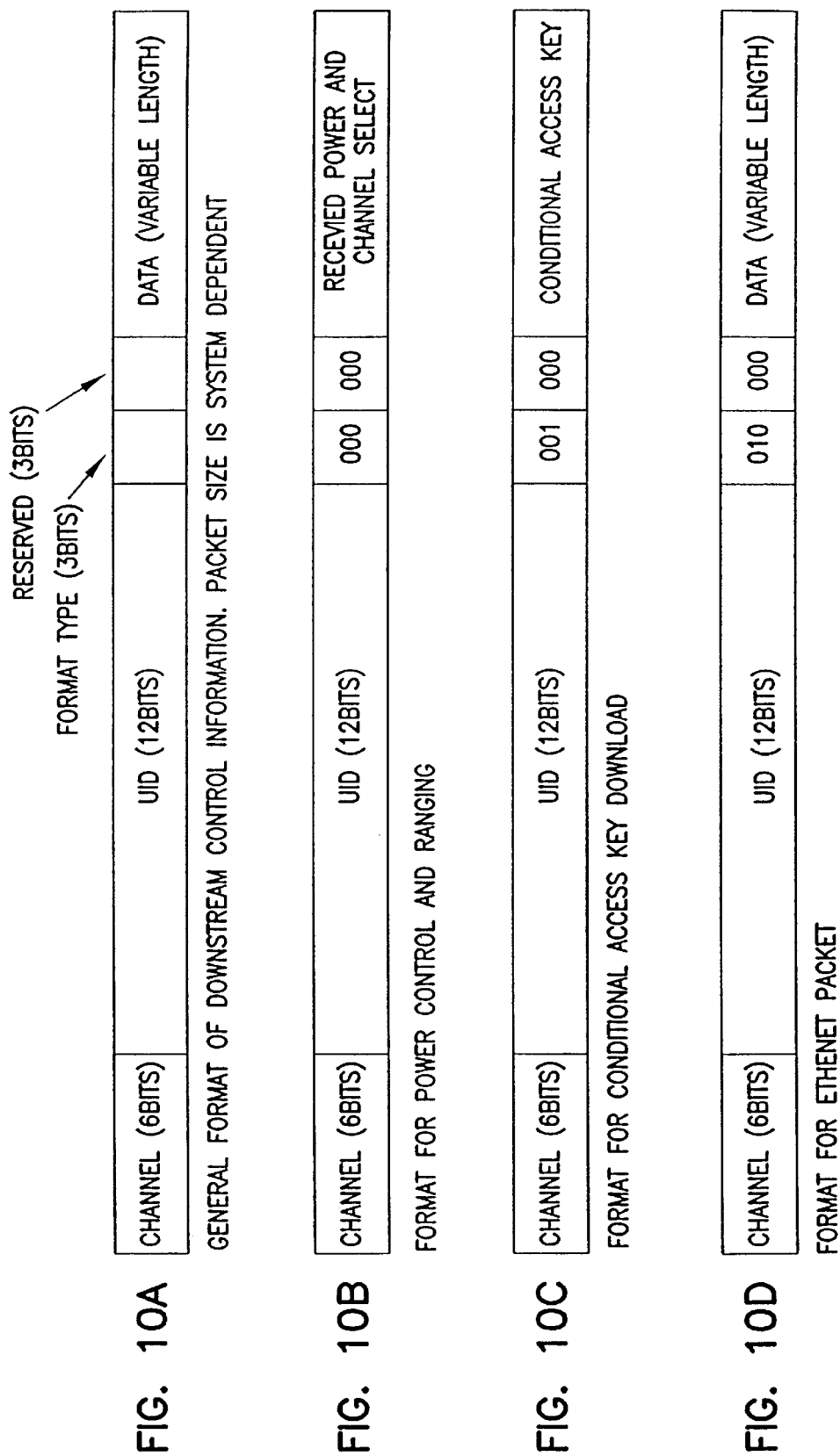

SYSTEM AND METHOD FOR TRANSMITTING DATA

This application is a divisional of U.S. patent application Ser. No. 09/409,753 filed Oct. 1, 1999, which is a continuatiuon of U.S. patent application No. 08/786,549 filed Jan. 21, 1997, now U.S. Pat. No. 5,978,650."

TECHNICAL FIELD OF THE INVENTION

The present invention relates generally to the field of telecommunications and, in particular, to a system and method for transmitting data.

BACKGROUND OF THE INVENTION

Consumers have an insatiable appetite for information and entertainment, colloquially referred to as "content." This can be seen in the popularity of television, the internet and other content based media that are delivered to subscribers or users over various "pipelines." A pipeline is a system that transmits data from a content provider, e.g., television station, website on the internet, etc., to a subscriber. For example, internet service providers such as AmericaOn Line use the telephony system as a pipeline to transmit information to its subscribers. The subscribers use a computer modem to dial-in to an internet service provider. Once on-line, the subscribers have access to various content providers (websites) and can download or upload information. Unfortunately, this is often a slow and cumbersome technique for conveying large quantities of data because the telephony system has transmission speed and bandwidth limitations. Certain subscribers have installed specialized high-speed telephonic connections, but the practice is not widespread because of the prohibitive costs.

Similarly, various conventional pipelines deliver video information from content providers with varying degrees of success. Conventionally, television stations use a wireless pipeline for delivering content to users. The television stations simply broadcast signals in a dedicated portion of the electromagnetic spectrum. Users access the signals with roof-top antennas. Cable systems are also used in many areas. These systems use coaxial cable to deliver video with increased quality and quantity directly to a user's home or premises. However, conventional cable systems do not allow for interactive feedback to the content providers over the cable system. Retrofitting the existing cable systems with this feature will be expensive and time consuming.

In recent years, the industry has developed another broadcast based pipeline for delivering video data to end users. This system is commonly referred to as "wireless cable." Wireless cable transmits microwave signals to subscribers from a central transmitter. The subscribers receive the signals with a microwave antenna that is placed on the roof-top of the subscriber's premises and aimed at the central transmitter.

A main drawback to the wireless cable systems is that there is a limited frequency spectrum that is available. Further, consumers desire to have access to interactive services over this pipeline. Some wireless cable systems have dabbled with providing two-way communication over their wireless cable systems. However, developers are left with the task of increasing the capacity of this pipeline by more efficiently using the limited spectrum that is available.

For the reasons stated above, and for other reasons stated below which will become apparent to those skilled in the art upon reading and understanding the present specification, there is a need in the art for a transmission system that efficiently uses the assigned spectrum and allows for bidirectional communication.

SUMMARY OF THE INVENTION

The above mentioned problems with transmission system and other problems are addressed by the present invention and which will be understood by reading and studying the following specification. A transmission system is described which provides a more efficient use of assigned spectrum while allowing bi-directional communication.

In particular, an illustrative embodiment of the present invention provides a transmission system that communicates data to a number of subscribers. The transmission system includes a transceiver that has a number of highly directional antennas. A number of digital repeaters are disposed in a geographic region serviced by the transceiver. The repeaters include a sectorized antenna that communicates with subscribers in a number of sectors of the geographic region of the repeater. The repeater also includes an upstream demodulator/modulator circuit. The upstream demodulator/modulator circuit demodulates data from signals from subscribers that were modulated with a first modulation technique, and generates a re-modulated signal with the data using a second modulation technique. The second modulation technique is different from the first modulation technique such that the signals from the subscribers from the number of sectors are combined in the re-modulated signal so as to increase the capacity of the transmission system. The digital repeaters also include a highly directional antenna, that is coupled to the demodulator/modulator circuit and that communicates the re-modulated signal to the transceiver.

BRIEF DESCRIPTION OF THE DRAWINGS

FIGS. 5A through 5F are timing diagrams that illustrate embodiments of data transmission in a transmission system;

FIGS. 10A through 10D are diagrams that illustrate embodiments of a command format for control frames for downstream communications in a transmission system according to the teachings of the present invention.

DETAILED DESCRIPTION OF THE INVENTION

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
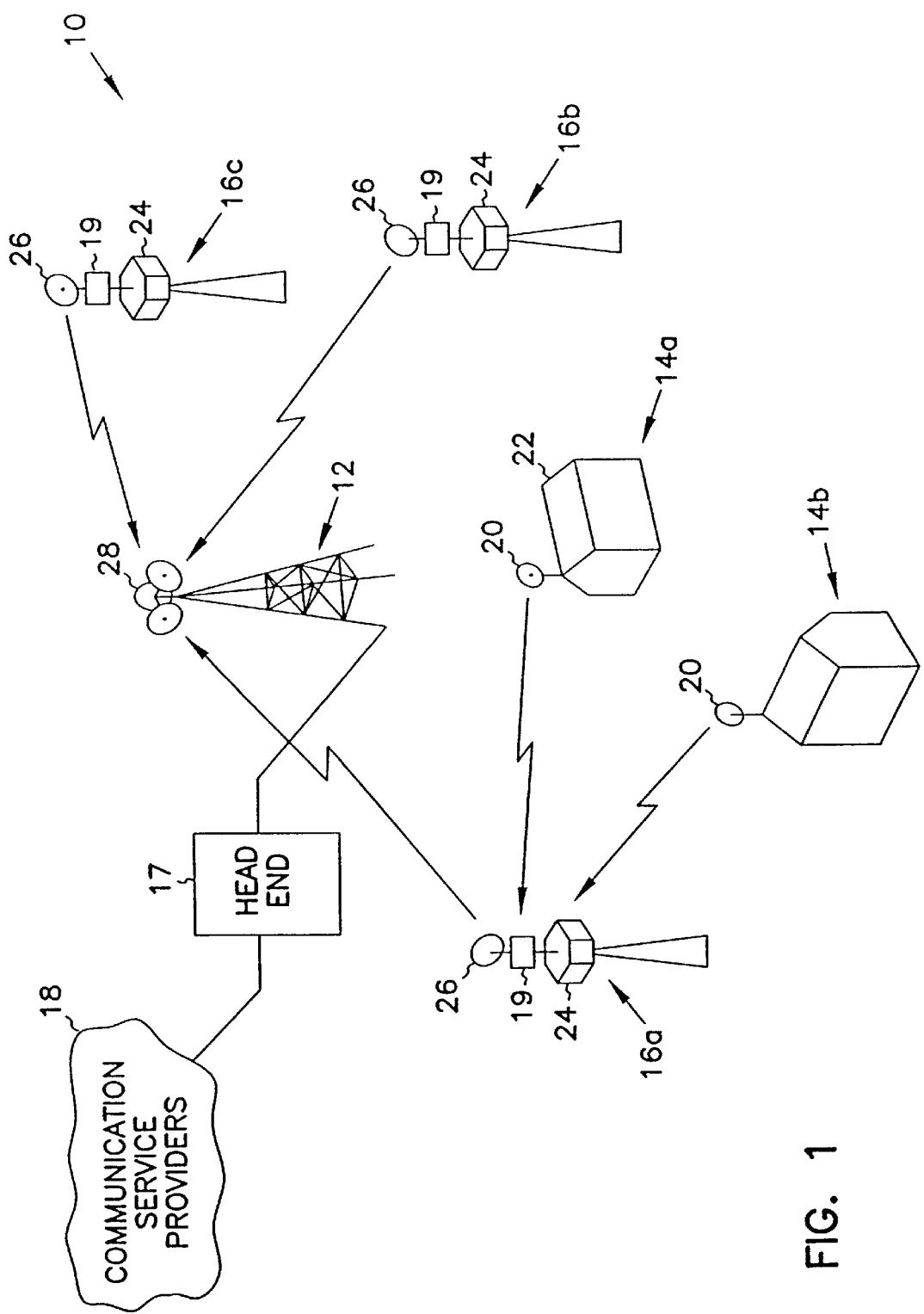
FIG. 1 is a representational diagram of an illustrative embodiment of a transmission system according to the teachings of the present invention.

FIG. 1 is a representational diagram of an illustrative embodiment of a transmission system, indicated generally at 10, according to the teachings of the present invention. Transmission system 10 provides for bi-directional transmission of data between central hub 12 and a number of subscribers. Central hub 12 is also referred to as a transceiver due to the bi-directional nature of its operation. Transmission system 10 may include a number of central hubs 12. In FIG. 1, subscribers 14*a* and 14*b* are shown for sake of clarity and illustration only. It will become clear from this specification, that transmission system 10 is designed to operate with a much larger number of subscribers on the order of 10,000 to 200,000 subscribers per central hub 12. Thus the subscribers of system 10 are generically referred to as "subscribers 14."

Transmission system 10 can transmit audio, video, or other data for use by a computer, a television, a telephone or other appropriate terminal of subscribers 14. Transmission system 10 provides a pipeline between communication service providers 18 and subscribers 14. Communication service providers 18 may, for example, provide services such as video, interactive video, internet connection, telephony or access to other content based services. Transmission system 10 includes head end 17 coupled between communication service providers 18 and central hub 12. Head end 17 can communicate with communication service providers 18 and central hub 12 over any appropriate communication link such as wireless, including satellite and microwave or wired communication link as shown in FIG. 1. Transmission system 10 further includes a number of digital repeaters, represented here by digital repeaters 16*a* through 16*c*. It is understood that transmission system 10 includes an appropriate number of digital repeaters referred to collectively as "digital repeaters 16."

Digital repeaters 16 are spatially distributed in a geographic region to form a cellular-type layout. Use of a cellular approach allows frequency re-use to increase the spectrum efficiency of transmission system 10. Subscribers 14 that communicate through different digital repeaters 16 can use the same frequency at the same time. Exemplary embodiments of cellular layouts are described below with respect to FIGS. 4A and 4B.

Figure 3:
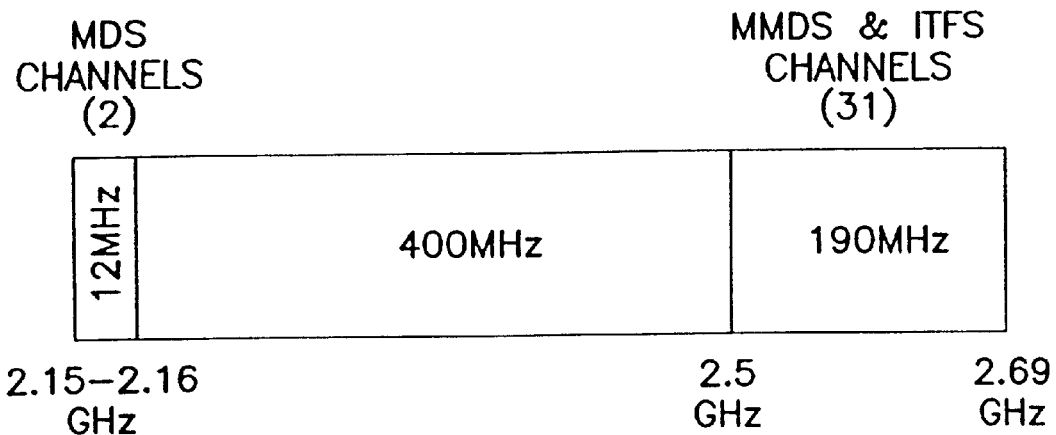
FIG. 3 is a spectral diagram that illustrates a portion of the electromagnetic spectrum that embodiments of the present invention may use for upstream and downstream transmissions.

In the embodiment of FIG. 1, transmission system 10 transmits digital data using the portions of the frequency spectrum currently licensed in the United States for analog multichannel multipoint distribution systems (MMDS), multipoint distribution systems (MDS) and instructional television fixed services (ITFS), as shown in FIG. 3. Specifically, transmission system 10 uses the two MDS channels for upstream communication and the 31 MMDS and ITFS channels for down stream communication. These channels are specified as standard 6 MHz video channels as used in conventional analog video transmission. The two upstream channels occupy the spectrum between 2.15 and 2.16 GHz and the 31 downstream channels occupy the spectrum between 2.5 and 2.69 GHz. In one embodiment, five of the 31 downstream channels are reserved for data transmission such as for connection to the internet and the remaining twenty-six channels are reserved for video transmission such as commercial or pay television channels.

Transmission system 10 uses packets of digital data to increase the number of effective channels of the system. Specifically, transmission system 10 uses MPEG compression so as to transmit as many as 6 video channels in one 6 MHz channel. Similarly, transmission system 10 transmits multiple data channels in a single 6 MHz channel.

For upstream communication, transmission system 10 uses highly directional transmission between subscriber 14 and digital repeater 16 and between digital repeater 16 and central hub 12. Advantageously, this allows transmission system 10 to more efficiently use the available electromagnetic spectrum by using the same two MDS 6 MHz transmission channels for transmissions between subscribers 14 and digital repeaters 16 and between digital repeaters 16 and central hub 12.

Each subscriber 14 includes cardioid antenna 20 that is directed at an assigned digital repeater 16. Cardioid antenna 20 is disposed at an elevation sufficient to allow line-of-sight transmission to repeater 16. Typically, cardioid antenna 20 is disposed between 2 and 10 feet above roof 22 of subscriber 14.

Figure 4A:
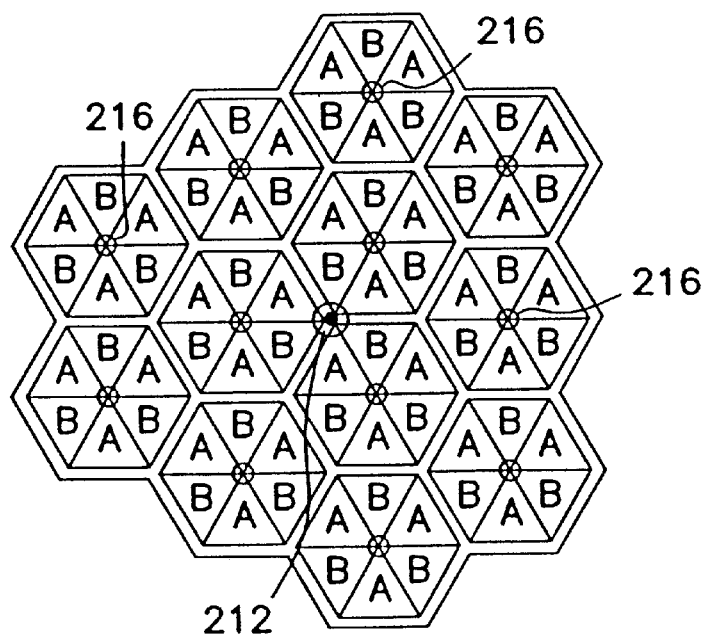
FIGS. 4A and 4B are schematic diagrams of exemplary spatial distributions of a number of digital repeaters in embodiments of the transmission system of FIG. 1 that form various cellular layouts.

Further, digital repeater 16 includes antenna 24 and cardioid antenna 26. Antenna 24 may, for example, be a sectorized antenna to divide a cell into as many as six sectors. For example, FIG. 4A is a schematic diagram that shows a cellular layout wherein the cell boundaries are designated by a double line and sector boundaries within a cell are designated by a single line. It is understood that this is an idealized hexagonal cellular layout and that in practice the cells will overlap and have irregular shapes due to the terrain and other factors known to those skilled in the art. Other cellular and sectorization schemes may be used substituted as known to a person of ordinary skill in the art. Each sector is assigned to one of the two MDS 6 MHz channels such that adjacent sectors use different upstream channels. As shown in FIG. 4A, for example, the sectors labeled "A" use channel MDS 1 to communicate with digital repeaters 216 and the sectors labeled "B" use channel MDS 2. This produces a three-times frequency re-use and further reduces the risk of interference being introduced into the transmissions from subscribers 14. To further isolate adjacent sectors and reduce potential interference, alternating sectors could use different polarization. For example, the sectors could alternate between left and right circular polarization, horizontal and vertical polarization or other appropriate polarizations.

Figure 4B:
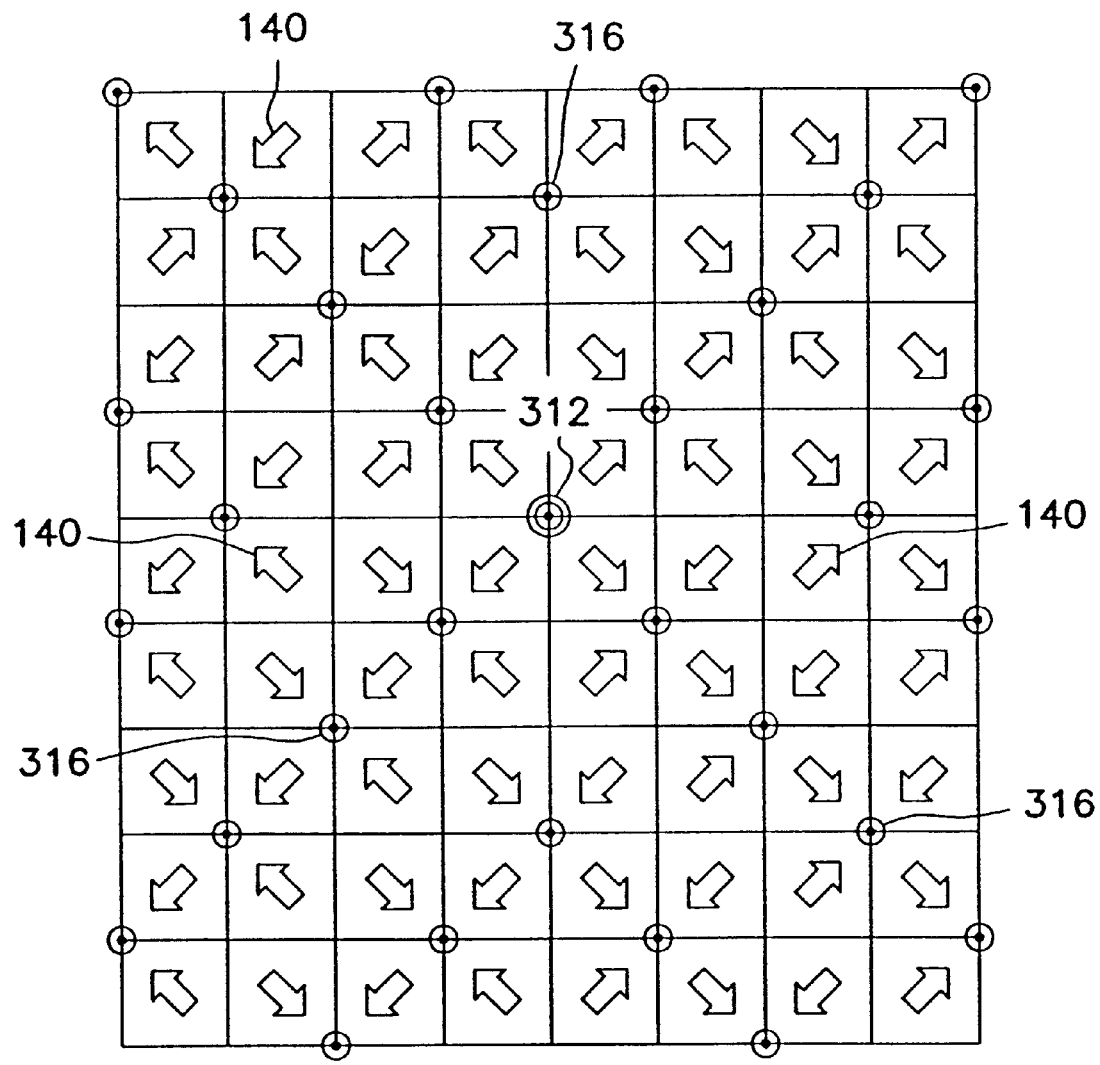

Cardioid antenna 26 is disposed so as to direct transmissions at central hub 12. Cardioid antenna 26 is disposed at an elevation approximately six feet or more above antenna 24 so as to reduce potential interference between transmissions from subscribers 14 and transmissions to central hub 12 since these transmissions can use the same MDS channels. Potential interference could further be reduced by varying the polarization of the transmissions to and from digital repeater 16. For example, in one embodiment subscribers 14 transmit signals with left hand circular polarization and digital repeater 16 transmits signals to central hub 12 with right hand circular polarization, or vice versa. Alternatively, vertical and horizontal polarization could be used. Central hub 12 includes at least one cardioid antenna 28 for each digital repeater 16. To further reduce the potential interference and improper signals being received by central hub 12, digital repeaters 16 can be positioned such that subscribers 14 do not transmit toward central hub 12. Such a layout is shown in FIG. 4B using 90 degree sectors. In this embodiment, arrows 140 are situated to indicate the digital repeater 316 used by subscribers in each cell to communicate with central hub 312. This approach is equally applicable to sectorization techniques with other numbers of sectors. The key is to assign subscribers to a digital repeater such that the transmissions to the digital repeater are not aimed at the central hub.

For upstream communications, each MDS 6 MHz channel is divided into 48 narrowband transmission channels. The narrowband transmission channels have a bandwidth of 100 kHz and separation of 125 kHz. Subscribers 14 use quadrature phase shift keying (QPSK) modulation, for example, which accommodates two bits of data for each hertz of bandwidth. Thus subscribers 14 can transmit data at a rate of 200 kilobits per second (bps). It is noted that transmission system 10 can further increase the number of available channels by using a 1 to 4 time division multiplexing technique to allow four users to share one 100 kHz channel.

QPSK modulation allows effective communication at low power. In transmission system 10, subscribers 14 typically will transmit at low power due to financial constraints on transmission equipment for subscriber 14. Further, the limited elevation of cardioid antenna 20 results in attenuation of power in signals from subscriber 14 due to ground effects and other interference. Thus, QPSK is an acceptable modulation technique for this low power transmission. Other modulation techniques which provide for robust transmission at low power levels could similarly be used.

Since each MDS 6 MHz channel is used by three sectors in this embodiment, transmission system 10 uses a different modulation technique to transmit between digital repeaters 16 and central hub 12. This allows the same two MDS 6 MHz channels to be re-used and carry up to three times the information as the MDS channels carried between subscribers 14 and digital repeaters 16. To accomplish this, digital repeaters demodulate the transmissions from subscribers 14 and use a quadrature amplitude modulation technique with 64 points in the constellation (QAM 64) to generate the signals to be transmitted to central hub 12. QAM 64 accommodates six bits per hertz of bandwidth as opposed to the two bits for QPSK, thus this produces the needed three-fold increase in spectral efficiency. Further, each MDS 6 MHz channel is divided into 144 sub-channels of 33.3 kHz with 41.7 kHz of separation for transmissions from digital repeater 16 to central hub 12. Transmissions from digital repeater 16 to central hub 12 are not as susceptible to ground effect attenuation or other forms of interference. Thus, a less robust modulation technique such as QAM 64 can be used. It is understood that other modulation techniques that provide for the re-use of frequencies in the different sectors can be used in place of QAM 64.

In operation, transmission system 10 transmits upstream communications from subscribers 14 to communication service provider 18 through central hub 12. For example, subscriber 14a modulates a carrier with data using a QPSK modulation technique. Subscriber 14a transmits this signal with cardioid antenna 20. Digital repeater 16a receives signals from subscribers including subscriber 14a with antenna 24. Digital repeater 1 6a demodulates the signals from the subscribers and re-modulates the signals using QAM 64 modulation. Digital repeater 16a transmits the re-modulated signals to central hub 12. Central hub 12 transmits the signals to communication service provider 18 through head end 17. Similarly, transmission system 10 also transmits data downstream to subscribers 14. To accomplish this, transmission system 10 can use the same antennas or can include a separate set of antennas for downstream transmission.

Figure 2:
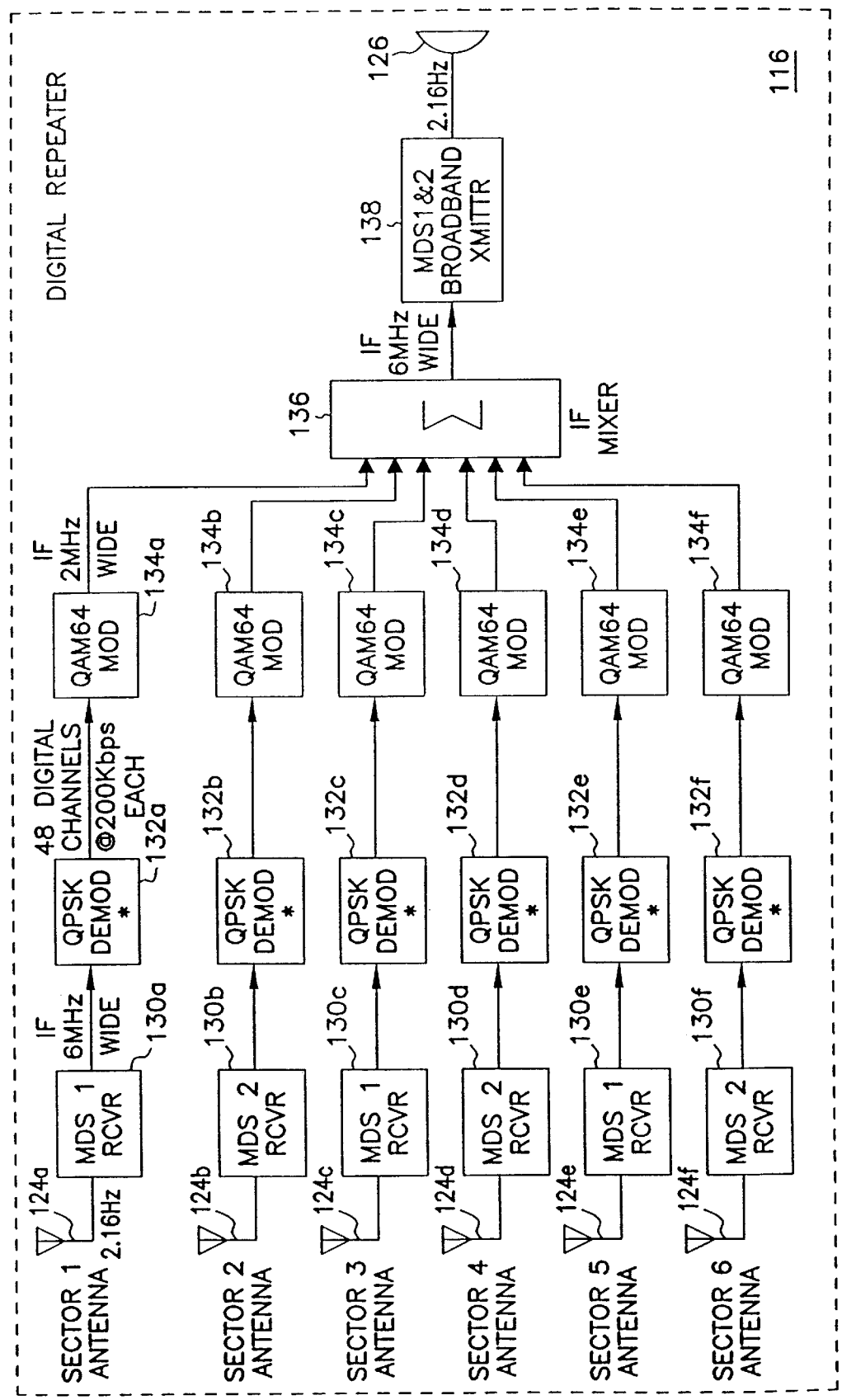
FIG. 2 is a block diagram that illustrates an embodiment of an upstream communication portion of an rf repeater for use in the transmission system of FIG. 1.

FIG. 2 is a block diagram of an embodiment of the upstream communication of a digital repeater, indicated generally at 116, and constructed according to the teachings of the present invention. It is understood that digital repeater 116 includes appropriate circuitry for transmitting downstream data to subscribers 14. Digital repeater 116 includes sector antennas 124a through 124f that are coupled to receivers 130a through 130f, respectively. Receivers 130a, 130c, and 130e are tuned to the first MDS 6 MHz channel. Further, receivers 130b, 130d, and 130f are tuned to the second MDS 6 MHz channel. Receivers 130a through 130f are coupled to QPSK demodulators 132a through 132f, respectively. Further, QPSK demodulators 132a through 132f are coupled to QAM 64 modulators 134a through 134f. The output of each QAM 64 modulator is coupled to IF mixer 136. The output of IF mixer 136 is coupled through broadband transmitter 138 to cardioid antenna 126.

In operation, digital repeater 116 receives signals from subscribers 14 and changes the modulation of the signals so as to efficiently use the electromagnetic spectrum reserved for upstream communications. For example, subscriber in sector 1 transmit signals that are received at antenna 124a and receiver 130a. The output of receiver 130a is supplied to QPSK demodulator 132a as a 6 MHz band of signals. QPSK demodulator 132a demodulates the signals from the subscribers in sector 1 to produce 48 digital channels of 200 kbps each. QAM 64 modulator 134a generates a signal with a 2 MHz bandwidth from the output of QPSK demodulator 132a using QAM 64 modulation of the 48 digital channels. IF mixer 136 combines the signal from QAM 64 modulator 134a with similar signals from QAM modulators 134b through 134f to produce a signal with a 12 MHz bandwidth. Broadband transmitter 138 upconverts, amplifies, filters and transmits the signal to central hub 12 with cardioid antenna 126.

In one embodiment, transmission system 10 of FIG. 1 is controlled by a media access control (MAC) protocol. The MAC protocol supports video-on-demand services, data services, and control functions. The MAC protocol is an asymmetric protocol which uses fixed size MPEG 13818-1 transport stream transport packets for downstream transmissions and short, fixed size slots for upstream transmission. The protocol is consistent with DAVIC Technical Specifications 1.2 for MMDS by using transport packets for downstream. DAVIC presently leaves the upstream undefined ("reserved"). The MAC protocol of this embodiment is described in conjunction with FIGS. 5A through 10.

The downstream protocol is based on a single high speed (27 Mbps) channel which contains data packets for many users and provides reliable packet delivery using automatic repeat request (ARQ). The downstream link protocol used is based on the GoBackN protocol with N set to 4 (i.e., 2 bits). The upstream protocol is a slotted collision detect protocol distributed over many low speed (200 Kbps) channels with explicit acknowledgment of packets. Again, the ARQ protocol used is GoBackN, with N set to 64 (i.e., 6 bits). The upstream bandwidth is also managed by a bandwidth reservation system controlled by headend 17. This system permits headend 17 to reserve upstream slots for particular subscriber 14 and is used to improved protocol efficiency. The complete protocol is designed to be simple and flexible, yet efficient.

FIGS. 5A through 5F are timing diagrams that illustrate embodiments of data transmission in transmission system 10 of FIG. 1. A definite timing relationship is maintained between the downstream and upstream packets, e.g., 50:1 in this embodiment. Downstream packet sizes are 188 bytes at a data throughput rate of 27 Mbps. Upstream slots are 68 bytes with additional preamble and guards to maintain the correct ratio.

Downstream packet delivery is composed of two types of MPEG-2 transport packets, data transport packets and acknowledgment transport packets. Data transport packets are identified by a unique packet identification (PID) and acknowledgment transport packets are identified by a different unique PID. As illustrated in FIGS. 5A and 5B, the downstream data stream is composed of a sequence of 50 data transport packets 200 followed by an acknowledgment transport packet 202.

FIG. 5A illustrates the downstream packet sequence generated by headend 17. Each slot in the downstream takes one downstream slot time ($t_{DS}$) to be transmitted. FIG. 5B shows a propagation delay ($t_{PD}$) from the transmission of the acknowledgment packet to the arrival of the first bit of the acknowledgment packet at subscriber 14. FIGS. 5C and 5D illustrate that once the entire packet has been received, subscriber 14 uses the packet as a timing mark 204 and delays transmitting on the upstream for ranging adjustment ($t_{RA}$). FIG. 5E shows that if the subscriber has any data to transmit and the slot has not been reserved as described below, the subscriber may attempt to send an upstream packet 206. FIG. 5F illustrates a propagation delay ($t_{PD}$) from the transmission of the first bit of the upstream packet to the arrival of the upstream packet at headend 17. Because the upstream slot size is determined by a fixed ratio (e.g., 50:1), the time to transmit the upstream slot, i.e., upstream slot time ($t_{UA}$) is defined by $50+t_{DS}$.

The ranging adjustment time ($t_{RA}$) is set for each subscriber 14 so that upstream slots from all subscribers arrive at headend 17 at the same time. This ensures that either a packet is received by headend 17 during the fixed slot time or one or more packets collide in a synchronized manner at headend 17. In the case in which collision occurs, all packets are assumed to be lost. Packet collision is detected by a failure to recognize a packet and is aided by using a cyclic redundancy check (CRC).

Figure 6:
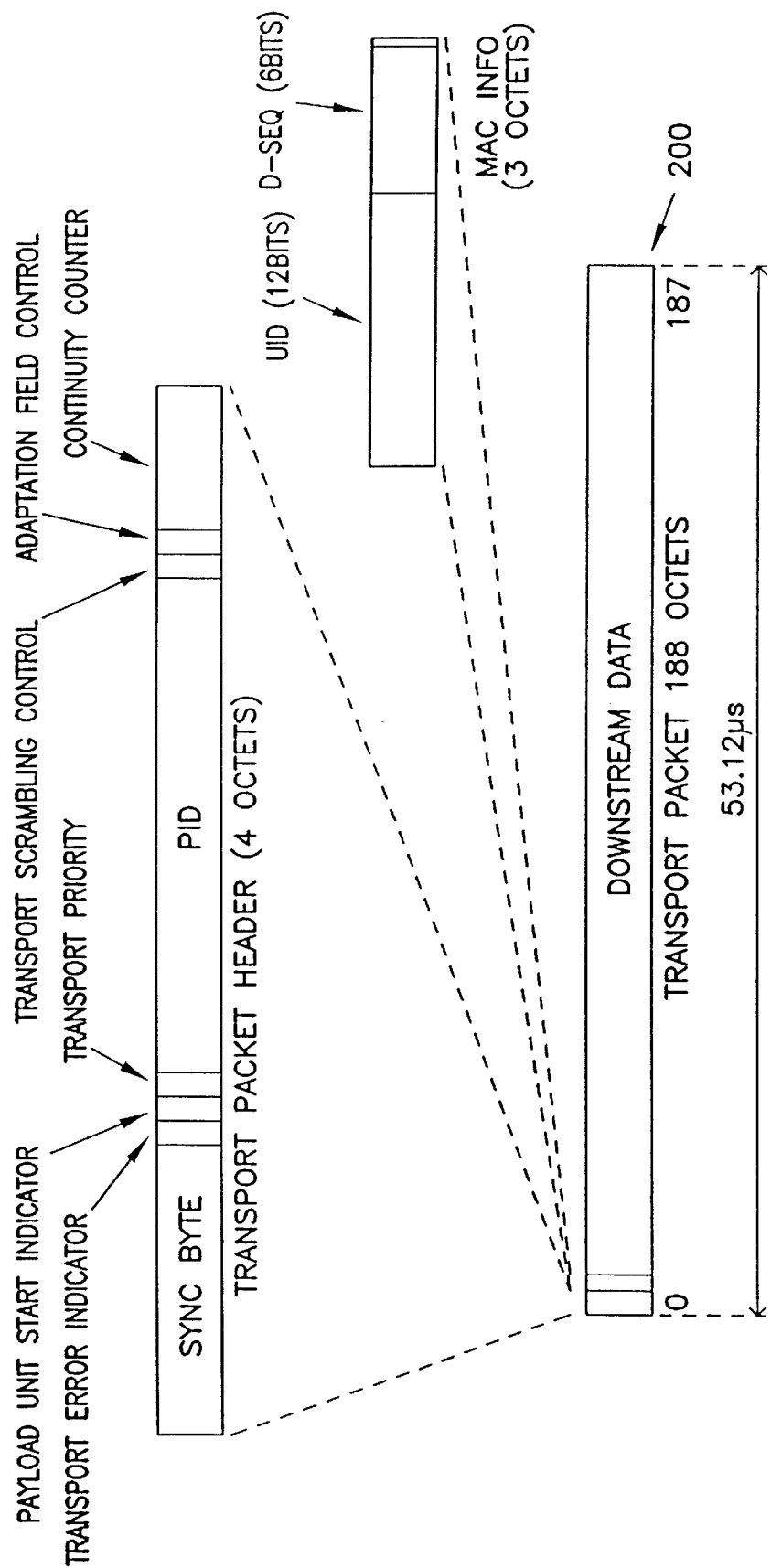
FIG. 6 is a diagram that illustrates an embodiment of the frame format of downstream data packets.

FIG. 6 is a diagram that illustrates the frame format of the downstream data packets 200. The basic form of the packet is an MPEG 13818-1 transport packet of fixed size (e.g., 188 bytes) and contains a 4 byte header. In general, transport packet PIDs are used to indicate program content including video and audio streams. In order to prevent any conflict with video programming the PID field is used only in the most limited manner. Specifically, two PIDs are used, one to indicate "normal" downstream data and the other for downstream acknowledgment.

The MAC protocol includes two additional fields that immediately follow the transport header field and are as follows:
1) The User Identification (UID) field is 12 bits. Each subscriber 14 is assigned a unique UID number for the channel in which it resides. The UID is used in all dialogues between headend 17 and the subscriber 14. There will typically be a mapping between the UID and other subscriber identification numbers, e.g., Ethernet MAC address, IP address, or subscriber billing number. The UID has a context only between headend 17 and subscriber 14 and should be otherwise transparent. If a subscriber 14 is reassigned to a new channel (as may happen as system load increases) the subscriber 14 will receive a new UID.

2) The Downstream Sequence Number (D-Seq) field is 6 bits. The D-Seq field is used to permit multiple unacknowledged frames to be maintained in a transmission buffer for the subscriber 14. The protocol used with the D-Seq field is GoBackN.

Figure 7:
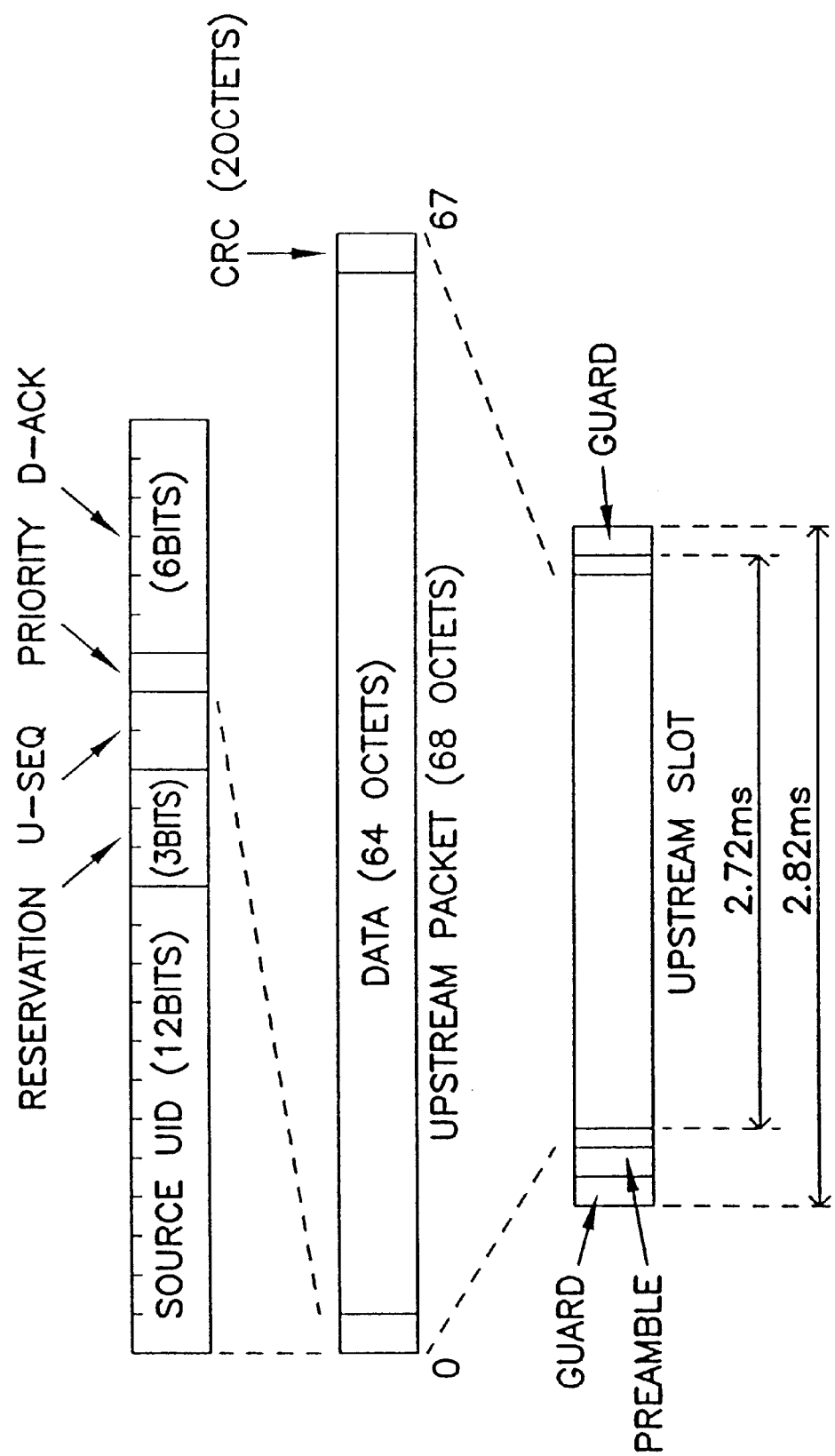
FIG. 7 is a diagram that illustrates an embodiment of the format of upstream data frames.
Figure 8:
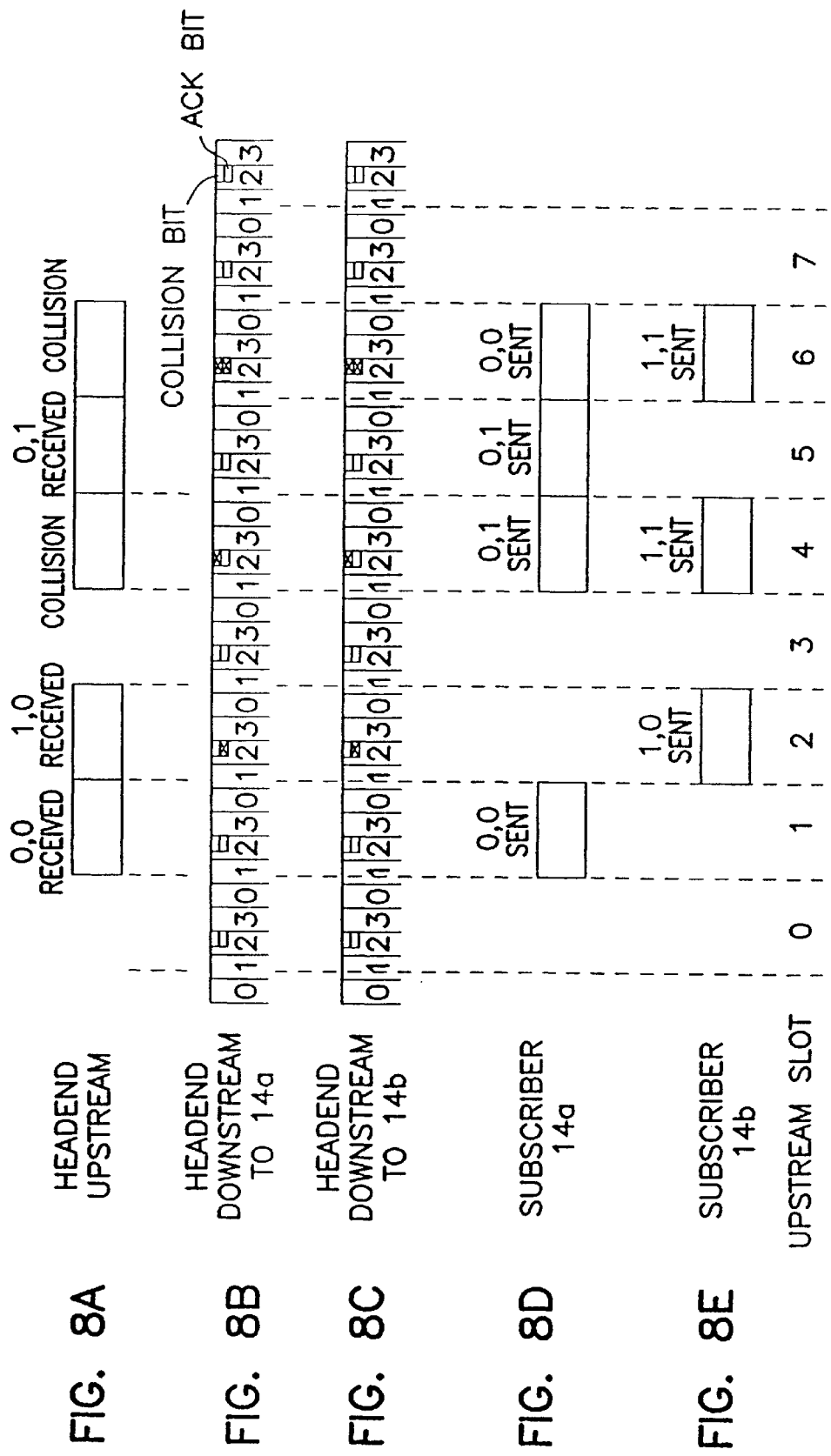
FIGS. 8A through 8E are timing diagrams that illustrate an embodiment of a collision detection method in upstream communications.

FIG. 7 is a diagram that illustrates the format of upstream data frames 206. The frame length is defined to be some integer number of downstream packets and is synchronized to the downstream packet rate. For this embodiment the ratio is 50:1.

The fields in the upstream frame format are as follows:
1) The guard field contains a variable number of bits that are used to provide space between slots.
2) The preamble field contains 16 bits, 01010101 01111110, that are used to synchronize the incoming packet at headend 17.
3) The source UID is 12 bits that indicate the source user identification number.
4) The reservation field is 3 bits that provide reservation information as described in more detail below.
5) The Upstream Sequence Number (U-Seq) field is 2 bits that permit multiple unacknowledged frames to be maintained in a transmission buffer of headend 17. The protocol used with the U-Seq field is GoBackN.
6) The priority field is 1 bit that indicates the message priority to headend 17.
7) The D-ACK field is a 6 bit acknowledgment field that is used by the MAC layer of headend 17 to identify when a downstream data packet is out of sequence. The protocol used (in conjunction with the D-SEQ field) is GoBackN.
8) The data field is 64 bytes.
9) The cyclic redundancy check (CRC) field is a 16 bit field that permits headend 17 to identify when an incoming packet is in error. In one embodiment CCITT-16 is used.

FIGS. 8A through 8E are timing diagrams that illustrate an embodiment of a collision detection method in upstream communications for the MAC protocol. This method provides an efficient mechanism for ensuring that subscribers 14 are aware when a collision has taken place. As described above, there is exactly one downstream acknowledgment packet in each upstream slot time. This packet is timed to be delivered somewhere in the middle of the upstream slot time (although this time reference will vary depending on the distance of the subscriber from headend 17) and is used to provide a collision detection function for each of the upstream slot times. Thus by inspecting the downstream collision indication in the slot immediately following an upstream transmission, subscriber 14 is able to determine if an upstream packet was received by headend 17.

FIGS. 8B and 8C show the use of a single acknowledge (ACK) and collision bit as they relate to two subscribers 14a and 14b, respectively, on the same channel. The ACK and collision bits form part of the downstream acknowledge packet. This packet includes bits for all channels as discussed below. The ratio between up and downstream slots is only 4 for illustrative purposes.

FIGS. 8D and 8E show transmissions from subscribers 14a and 14b, respectively. FIG. 8A shows the result at headend 17. FIGS. 8B and 8C show headend 17 transmission with embedded acknowledgments and collision notifiers.

Upstream slot 0 shows neither subscriber using the channel. Upstream slot 1 shows subscriber 14a sending a frame (i.e., frame 0,0). Upstream slot 2 shows subscriber 14b sending a frame (i.e., frame 1,0) and subscriber 14a receiving an ACK indicating frame 0,0 was received by headend 17 without collision. Upstream slot 3 shows neither station using the channel, however, subscriber 14b receives an ACK for frame 1,0. Upstream slot 4 shows both subscribers 14a and 14b attempting to send data. A collision occurs and both stations are made immediately aware of the situation via the downstream collision indication bit. Upstream slot 5 shows subscriber 14a sending a frame. Upstream slot 6 shows subscribers 14a and 14b attempting to send another frame. A collision occurs which both stations are made immediately aware of. In addition, subscriber 14a receives an ACK indicating frame 0,1 was received correctly.

Figure 9:
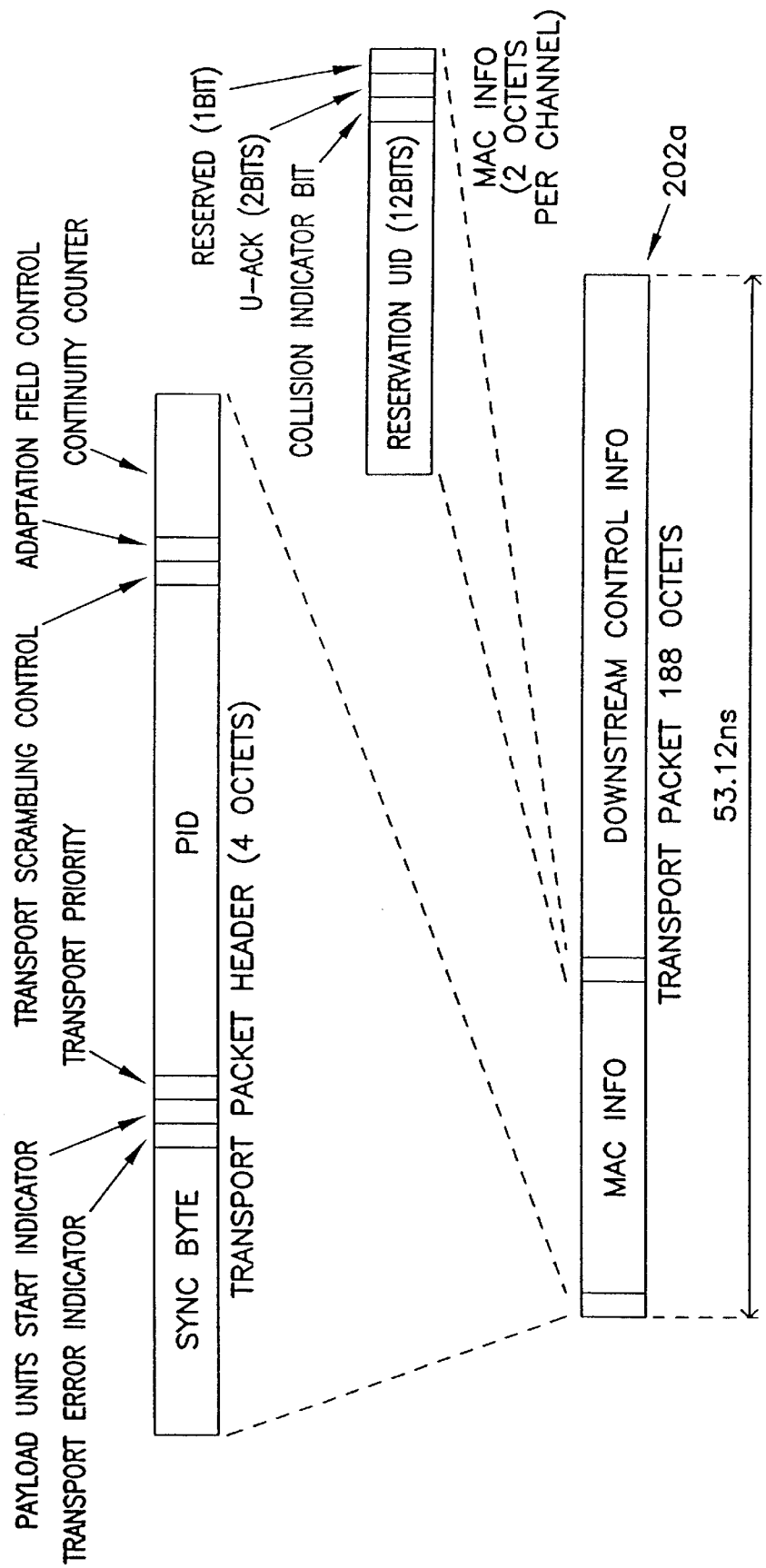
FIG. 9 is a diagram that illustrates an embodiment of downstream acknowledgment frames.

FIG. 9 is a diagram that illustrates an embodiment of a downstream acknowledgment frame, indicated generally at 202a, for the MAC protocol. The acknowledgment frame 202 is identified by a PID in the transport packet header, e.g., PID=2. The frame is divided into two parts, a "MAC Info" part and a "Control Info" part.

The MAC Info part of the frame is used for MAC protocol collision and acknowledgment for each of the downstream channels under control by headend 17 as described above. Thus, each upstream channel is mapped into a particular pair of bytes in the MAC Info part. The first pair of bytes corresponds to channel 0, the second pair to channel 1, and so on. The two-byte Mac Info for each channel contains the following fields:

1. The Reservation UID field is 12 bits. The reservation UID is used by the downstream to indicate which UID is permitted to use the next upstream slot on that channel. Details of the reservation mechanism are discussed below.
2. The Collision Indicator field is 1 bit. This bit indicates when a collision has occurred.
3. The User Acknowledgment (U-ACK) field is 2 bits. The U-ACK field is used by the subscriber MAC layer to identify when an upstream data is out of sequence. The protocol used (in conjunction with the U-SEQ field) is GoBackN. This field is similar to the ACK field as described above.
4. The Reserved field is 1 bit.

FIGS. 10A through 10D are diagrams that illustrate embodiments of a command format for control frames for downstream communications in a transmission system according to the teachings of the present invention. Specifically, FIGS. 10A through 10D illustrate various embodiments of the Control Info part of transport packets 202a of FIG. 9. The Control Info part is used for downstream control information (e.g., for system configuration, ranging, power control, and conditional access keys) and as a downstream for the Video On Demand (VOD) control services. However, the channel may also be used for downstream data services.

In FIGS. 10A through 10D the following fields are common:

1. The Channel field is 6 bits. The field indicates the channel to which this downstream control packet refers. Each Subscriber Unit is in one and only one channel, thus, if the Channel number and UID match, the packet is destined for this subscriber unit.
2. The User Identification (UID) field is 12 bits.
3. The Format Type field is 3 bits. A number of different frame formats are supported. The particular format to be decoded is identified by this field.
4. The Reserved field is 3 bits. The field indicates that the packet is reserved for future use.

In this embodiment, three acceptable formats are initially defined for the Format Type field. Format 000 is used for downstream ranging, power control, and UID assignment as shown in FIG. 10B. Format 001 is used for downstream conditional access key download as shown in FIG. 10C. The conditional access key is transmitted with the packet and is used to enable the subscriber to receive a particular video channel (as identified by the transport PIDs). Format 010 is used to convey downstream Ethernet packets as shown in FIG. 10D. This can also be used for VOD services which require general data transfer capabilities. It is envisaged that the subscriber unit will have an Ethernet aware protocol stack for this environment. Other frame formats may be defined as required.

The reservation protocol used by the MAC protocol is extremely flexible and designed to permit maximum control of the bandwidth by headend 17. Thus, the subscriber unit is kept as simple as possible.

Referring again to FIG. 9, a Reservation UID is identified for each downstream channel. In each channel, this Reservation UID is used by headend 17 to indicate which subscriber 14 can transmit in the following upstream time slot. The protocol works as follows: Each time a subscriber 14 sends an upstream frame, it includes a three bit field to indicate the number of additional frames the unit still needs to transmit (0=0 frames, 7=7+frames).

If the frame from subscriber 14 is received (via the U-ACK), subscriber 14 must then wait to be allocated a slot by headend 17, even if the channel is idle. Headend 17 maintains an estimate of the number of frames buffered by each subscriber 14 and uses this information to increase the upstream bandwidth utilization. Headend 17 may also track subscriber upstream data usage and demands, and constrain subscriber transmissions for appropriate sharing of the channel.

The scheduling policy for headend 17 is based on an assumption that the underlying traffic model is characterized by data bursts generated through either Near Video On Demand (NVOD) commands or web browsing traffic. In the event that the traffic characteristics changed, it is entirely possible to implement a new scheduling policy at headend 17 with no modification to subscribers 14.

The current embodiment attempts to accommodate the transmission of a typical data burst from a subscriber unit. Assuming that the typical burst length is B slots, a logical construct called a macro-slot, which is an integer multiple of B, is used for scheduling. The upstream is considered a sequence of macro-slots. Each macro-slot is divided into two portions, a sequence of reservation slots and a sequence of contention slots. Subscribers 14 participating in the reservation process burst data during the reservation slots in a round robin fashion. The round robin algorithm is used to ensure fairness. At the end of each macro-slot headend 17 is responsible for using statistics obtained from the previous macro-slot (e.g., number of collisions, ratio of reserved slots to contention slots and number of successfully transmitted packets in the contention period) to determine the ratio of the next macro-slot. The algorithm used to compute the ratio presently increases the number of contention slots when the number of collisions is too high and decreases the number of contention slots when the number of collisions is too low. This approach increases the channel throughput.

In addition to scheduling there is a requirement to impose rate control on the traffic. The recommended algorithm for headend 17 is based on restricting the upstream (downstream) flow to subscriber units based on the leaky bucket traffic model and is outlined as follows:

1. Headend 17 maintains a bucket for each subscriber which corresponds to an average data rate as determined by simulation studies. At present this is expected to be 20 Kbps (384 Kbps) and is filled at this rate.
2. Whenever an upstream packet is received, the bucket is drained at 200 Kbps (1 Mbps).
3. If the bucket is not empty and the reservation bits indicate the subscriber has more data to transfer.

The above two algorithms are used to demonstrate how headend 17 may define the upstream and downstream protocols. The actual protocol to be used can be varied based on various system constraints.

In the event that it was deemed necessary to support a signaling plane between headend 17 and subscriber 14 for multiple services classes (e.g., isochronous services, etc.) there are at least two approaches possible:

1. A separate UID could be assigned to each subscriber 14 which is dedicated to signaling.
2. A single bit in the upstream packet could be used to distinguish user data from control data. A bit that is presently unused and could be used for this function is the priority bit.

By including this feature it would be possible to support a variety of provisioned services such as those defined in Asynchronous Transfer Mode (ATM) by appropriate modification of the upstream and downstream scheduling policies used in headend 17. Such changes could be made transparent to previously deployed subscribers 14.

Although the protocol is the same for both Video On Demand and Data it exhibits different characteristics as indicated below. In particular, it is expected that particular channels will be designated as upstream (downstream) data channels and others as upstream (downstream) Near Video on Demand channels (NVOD). Thus a subscriber unit will be assigned to one or the other but cannot be both (however, the flexibility of the protocol does not preclude accessing data from a NVOD channel or Videos from a data channel).

For data services, bandwidth allocation will typically be one downstream channel and 32 upstream channels. Most of the downstream Transport Packets will have PID either 1 or 2 and all subscribers 14 will be tuned to the same downstream channel (the system is scalable in the sense that the entire concept may be replicated on multiple downstream/upstream channel sets). The ACK packet (PID=2) must be transmitted every 50 transport packets in order for the upstream protocol to operate properly. Since the upstream bandwidth is significant, it is expected that many upstream channels will be assigned to data services and thus the number of channels represented in the downstream MAC Info field will be large (perhaps 32) leaving little room for the Control Info field.

For VOD services, each downstream channel will be composed mainly of Video and Audio Transport Packets, however, the ACK packet (PID=2) is always required. As before, the ACK packet (PID=2) must be transmitted once for every 50 transport packets in order for the upstream protocol to operate properly. In general, the ACK packet will be used to provide the MAC functions and limited control functions required for VOD services. With this in mind, it is likely that only a few upstream channels will be assigned to VOD services and these will be used to accommodate a large number of simultaneous users. Typically the number of channels represented in the downstream MAC Info field will be small (perhaps only 4) leaving correspondingly more space for the Control Information. This space may be used to transmit general purpose Ethernet packets downstream if required. The downstream data rate is limited to about 380 Kbps in this case unless additional data transport packets are sent.

Associated with the protocol will be a number of time-outs. These are used to improve the efficiency of the protocol but do not contribute to the basic protocol correctness. The essential time-outs required are as follows:

1. Upstream retransmission timer for each subscriber 14 is set whenever an upstream packet is sent by the subscriber. If there is no acknowledgment by headend 17 within some time limit the subscriber will retransmit the packet.
2. Upstream ack timer for each subscriber is set whenever a downstream packet is received by the subscriber unit. If no upstream data is received from the subscriber unit within some time limit the subscriber unit will send an acknowledgment packet (i.e., repeat the last upstream packet with the correct D-ACK field set).
3. Headend 17 unit downstream retransmission timer is set whenever a downstream packet is sent by headend 17. If there is no acknowledgment by the within some time limit, headend 17 unit will retransmit the packet.

Other timers may be required to implement non-essential components of the protocol, e.g., support for the priority scheme. These are not described here.

The protocol also provides a limited facility for expedited data upstream. The priority field in the upstream packet is used by the subscriber to indicate to headend 17 that the data in the packet should be expedited. This information may be used or ignored by headend 17 depending on the upstream algorithm implemented in headend 17.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the specific cellular layout can be varied from the four and six sector layouts shown in the Figures. Further, it is contemplated that other modulation techniques can be used in place of the QPSK and QAM 64 techniques so long as they provide adequate frequency re-use among the sectors in the upstream direction. Further, other types of antennas may be used that provide highly directional communication between the central hub and the digital repeaters and between the digital repeaters and the subscribers.

What is claimed is:

1. A transmission system, comprising:

a central hub; and at least one digital repeater to communicate signals between the central hub and at least one subscriber unit, wherein each digital repeater includes a first antenna at a first elevation and a second antenna at a second elevation lower than the first elevation;

wherein the first antenna of each digital repeater is a highly directional antenna directed at the central hub for communication using a first modulation technique;

wherein the second antenna of each digital repeater is a sectorized antenna for receiving communications from subscriber units using a second, different, modulation technique.

2. The transmission system of claim 1, wherein the second elevation is at least six feet lower than the first elevation.

3. A method for communication between at least two subscribers and a central hub of a communication service provider, the method comprising;

directing first communications signals from each subscriber to a digital repeater using a highly directional antenna without directing the first communications signals at the central hub, wherein the first communications signals are modulated with data using a first modulation technique;

demodulating the data from the first communications signals;

combing data from the first communications signals;

generating a re-modulated communications signal with the combined data using a second modulation technique; and directing the re-modulated communications signal at the central hub from the digital repeater using a highly directional antenna.

4. The method of claim 3, wherein the second modulation technique is different from the first modulation technique.

5. The method of claim 3, wherein each highly directional antenna is a cardioid antenna.

6. A method for communication between at least two subscribers and a central hub of a communication service provider, the method comprising:

transmitting first communications signals from each subscriber to a digital repeater using a highly directional antenna and a first polarization, wherein the first communications signals are modulated with data using a first modulation technique;

demodulating the data from the first communications signals;

combining data from the communications signals;

generating a re-modulated communications signal with the combined data using a second modulation technique; and transmitting the re-modulated communications signal to the central hub from the digital repeater using a highly directional antenna and a second, different, polarization.

7. The method of claim 6, wherein the first polarization is selected from the group consisting of right hand circular polarziation, left hand circular polarization, vertical polarization and horizontal polarization.

8. The method of claim 6, wherein the second modulation technique is different from the first modulation technique.

9. A method for communication between at least two subscribers and a central hub of a communication service provider, the method comprising:

directing first communications signals from each subscriber to a sectorized antenna of a digital repeater using a highly directional antenna without directing the first communications signals at the central hub, wherein the first communications signals are modulated with data using a first modulation technique;

demodulating the data from the first communications signals;

combining data from the first communications signals;

generating a re-modulated communications signal with the combined data using a second modulation technique; and directing the re-modulated communications signal at the central hub from the digital repeater using a highly directional antenna.

* * * * *

UNITED STATES PATENT AND TRADEMARK OFFICE
CERTIFICATE OF CORRECTION

| | | |
|---|---|---|
| PATENT NO. | : 6,353,728 B1 | Page 1 of 1 |
| APPLICATION NO. | : 09/692117 | |
| DATED | : March 5, 2002 | |
| INVENTOR(S) | : Fischer et al. | |

It is certified that error appears in the above-identified patent and that said Letters Patent is hereby corrected as shown below:

At Claim 3, Column 13, Line 7, please replace "combing" with --combining--

At Claim 6, Column 13, Line 29, please insert --first-- after "the"

At Claim 7, Column 14, Line 7, please replace "polarziation" with --polarization--

Signed and Sealed this

Sixth Day of November, 2007

JON W. DUDAS
*Director of the United States Patent and Trademark Office*